Oct. 3, 1950          G. C. MILLAT          2,524,114
FLUID VALVE
Filed April 3, 1946
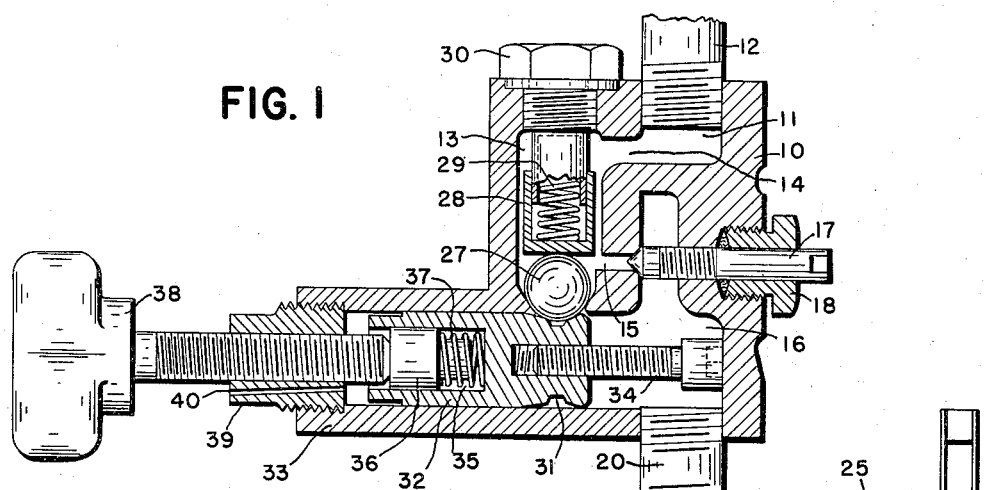
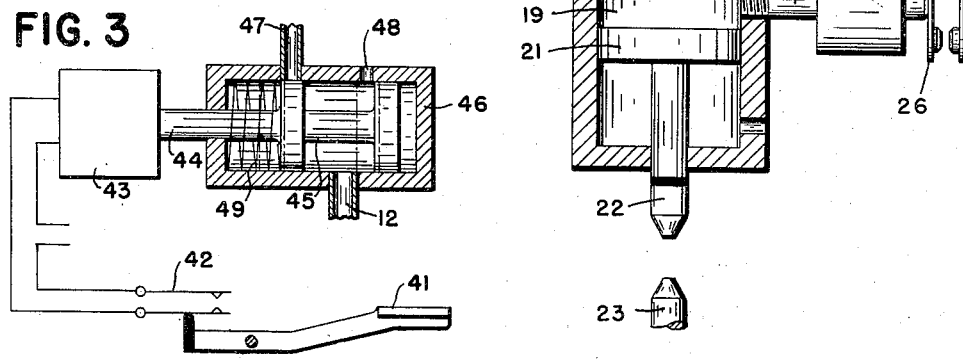
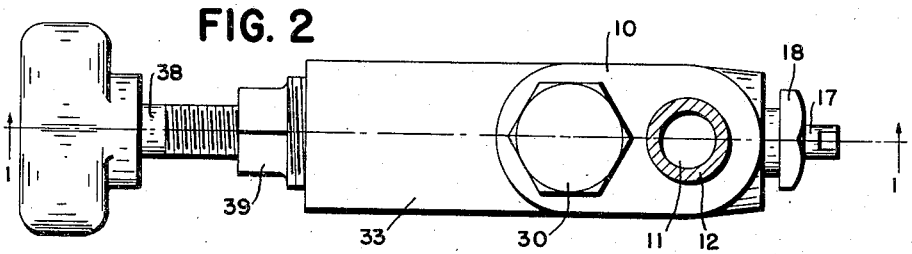
Inventor
GUSTAVE C. MILLAT
By Carl Benst.
His Attorney Patented Oct. 3, 1950

2,524,114

UNITED STATES PATENT OFFICE 2,524,114

FLUID VALVE

Gustave C. Millat, Dayton, Ohio

Application April 3, 1946, Serial No. 659,258

4 Claims. (Cl. 121—38)

This invention relates to improvements in fluid valves and particularly to that type of valve used to control sequential operations of machines.

One object of the invention is to provide a fluid valve which has a plurality of control conditions.

Another object of the invention is to provide a fluid valve for automatically controlling the flow of fluid at different pressures.

Another object of the invention is to provide a fluid valve which normally permits fluid to pass through one port into a chamber therein at a low-pressure velocity until the pressure in the chamber reaches a predetermined point, whereupon the fluid opens a second port to admit fluid into the chamber at a greater velocity and pressure.

Another object of the invention is to provide a fluid valve constructed to admit fluid into a pressure chamber at a low pressure through one port, to thereafter admit fluid through a second port at a higher pressure, and to release the fluid through said second port.

A specific object of the invention is to provide a fluid valve with a pressure chamber, a needle valve to admit fluid from a supply line into the pressure chamber at a slow rate, a normally closed port between the supply line and the pressure chamber, and a camming device to open the normally closed port when the pressure in the pressure chamber reaches a certain point to connect the supply line directly with the pressure chamber to admit the fluid into the pressure chamber at the maximum pressure of the supply line, and to thereafter release the pressure from the pressure chamber through the last-named opened port.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In said drawing:

Fig. 1 is a cross section of the valve, taken on line 1—1 of Fig. 2.

Fig. 2 is a top plan view of the valve.

Fig. 3 is a diagrammatic illustration of a conventional starting valve operated by a solenoid under control of a foot pedal.

General description

The construction and operation of the valve are, for convenience, described as controlling the operations of a spot welding machine. It will be obvious that the invention can be used in many other applications.

In the drawing, the elements of a spot welding machine which are controlled by the fluid valve are shown diagrammatically.

In spot welding operations, it is necessary that both of the electrodes have firm contact with the work to be welded before current is passed therethrough. Otherwise faulty welding occurs, and severe arcing takes place.

The fluid valve of the present invention controls the sequential operations, per se. In some spot welding machines, one electrode is mounted for movement into contact with the work by a piston operated by fluid in a cylinder. In the present description, it will be assumed that 20 pounds' pressure is sufficient to move the piston carrying the movable electrode, to move the electrode into contact with the work to be welded, and that 60 pounds' pressure is required to hold the electrode firmly in contact with the work when the current is applied to the electrodes. A needle valve admits air into a pressure chamber in the valve, and this pressure chamber is connected to the piston cylinder. When 20 pounds' pressure has been built up in the pressure chamber, a cam member is operated thereby and moves to open a port to admit fluid directly from the supply line, having 60 pounds' pressure, into the pressure chamber and into the cylinder. This causes the fluid to press the electrode firmly against the work, and at the same time actuates a second piston to close a switch of an electrical circuit through the electrodes.

In the illustration, the second piston is shown as being tapped into the cylinder of the electrode piston. However, this line can be tapped directly into the pressure chamber if desired.

At a given interval, the fluid is cut off from the supply line, and the fluid is then discharged through the port through which the high pressure is admitted into the pressure chamber. When the pressure in the pressure chamber has been sufficiently reduced, a spring returns the cam into its original position, and the last-named port is automatically closed.

The valve is now in condition to start another cycle of operations.

Detailed description

The valve consists of a main body 10, having a tapped opening 11, into which a pipe 12 is screwed. The pipe 12 is the supply line through which fluid is admitted into the valve. As shown in Fig. 1, the opening 11 is disposed vertically in the body 10 and is connected with a vertical port 13 by a horizontal opening 14. A small port 15 connects port 13 with the pressure chamber 16. An adjustable needle 17 forms a metering means and is mounted in the main body 10 to control the flow of fluid through the port 15. A packing nut 18 prevents loss of fluid through the opening for the needle 17.

The pressure chamber 16 is connected to a cylinder 19 by pipe 20. A piston 21 in cylinder 19 carries an electrode 22, adapted to be lowered into contact with work to be welded, which is held on a second electrode 23. It is to be understood that the cylinder 19, the piston 21, and the electrodes 22 and 23 are shown diagrammatically, and no attempt has been made to disclose the conventional construction thereof.

Connected to cylinder 19 by means of a pipe 24 is a cylinder 25 for closing switch 26, the latter being in an electrical circuit for supplying current to the electrodes 22 and 23. The cylinder 25 and the switch 26 are also shown diagrammatically.

The port 13 is open at its lower end for communication with the pressure chamber 16. Normally this opening is closed by a ball 27, held in a seat ground in the bottom of the port 13, by a spring-pressed member 28. The ball 27 is assembled into the valve through an opening at the top of the body 10. A spring 29 is compressed between the member 28 and a pilot of a screw 30, as shown in Fig. 1.

The ball 27, when in position to close the port 13, lies in an annular groove 31 of a cylindrically-shaped cam 32, slidably mounted in an extension 33 of the body 10. An adjusting screw 34, having a head bearing against an inner wall of the pressure chamber, affords a means for accurately locating the groove 31 with respect to the ball 27.

The cam 32 is provided with an opening 35, into which fits a spring pilot 36, for guiding a spring 37 against the inner end of opening 35, to normally maintain the slide in the position as determined by the adjusting screw 34.

Proper tension is maintained in spring 37 by an adjustable screw 38, which is threaded through a packing nut 39 into contact with the spring pilot 36. By adjustment of the screw 38, the tension of the spring 37 can be varied at will. When a predetermined pressure is built up in pressure chamber 16, the slide 32 is moved leftwardly to cam the ball 27 upwardly.

A bleeding port 40 is provided to permit free movement of slide 32.

Fig. 3 illustrates one method of controlling the starting and stopping of the flow of fluid through the fluid valve. It is to be understood that this showing is conventional and that any well-known starting and stopping valve can be used.

The machine can be started by a foot treadle 41, which closes switch 42, electrically connected to a solenoid 43. An armature 44 is connected to a piston 45 in a cylinder 46, to which is connected the supply pipe 12. An intake pipe 47, connected to the cylinder 46, is coupled with the fluid source. A port 48 in the cylinder 46 opens to atmosphere, when air is the fluid means. If a liquid is the fluid, the port 48 is connected to a reservoir.

In the description of the operation of the fluid valve, it is assumed that a pressure of 60 pounds is supplied through the supply line 12 and that the needle valve 17 is set to permit a slow passage of fluid through port 15. Also it is assumed that it requires 20 pounds' pressure to move piston 21 and slide 32.

The machine operation is started by operating the foot treadle 41, which closes switch 42 to energize solenoid 43 and move piston 45 leftwardly (Fig. 3). This movement of piston 45 closes port 48 and permits the flow of fluid from the fluid source 47 through cylinder 46 into the supply pipe 12. After the proper time interval, switch 42 is opened to deenergize solenoid 43 to release piston 45 to the action of a spring 49, whereupon the source 47 is closed and the cylinder is opened to the atmosphere.

Opening of the source of fluid supply through pipe 12, to start operation of the valve, admits fluid into port 13. The fluid passes through port 15 into the pressure chamber at a slow rate determined by the setting of needle 17. When 20 pounds' pressure is built up in the pressure chamber 16 and through pipe 20 in cylinder 19, the piston is moved to lower electrode 21 into contact with the work to be welded. 20 pounds' pressure in the pressure chamber also overcomes spring 37 to move slide 32 leftwardly. The cam on the annular groove 31 thereby lifts ball 27 off of its seat in the bottom of port 13. This admits the 60 pounds of fluid on the supply line to by-pass the port 15 to raise the pressure in the pressure chamber 16 and the cylinder 19 to 60 pounds. The surge of fluid into the cylinder 19 acts on cylinder 25 to close switch 26 through the electrical circuits for applying current to the electrodes 22 and 23. After the usual time element, controlled by timing devices on the machine, the supply pipe 12 is closed to stop flow of fluid through said supply pipe, and the latter is opened to atmosphere. At this instant, the pressure in the pressure chamber is still high enough to hold the slide 32 and the ball 27 in their moved positions, thus permitting the fluid to exhaust back through port 13 and pipe 12, which is now open to atmosphere.

At this point, it is desired to point out that port 13 acts both as a supply port and as an exhaust port for the fluid. This novel arrangement forms an important element of the invention. Heretofore it was deemed necessary to supply fluid from two different sources of varying pressures to the port 11, with corresponding duplications in control devices.

While the form of mechanism shown and described herein is admirably adapted to fulfill the objects primarily stated, it is to be understood that it is not intended to confine the invention to the one form or embodiment shown, for it is susceptible of embodiment in various forms all coming within the scope of the claims which follow.

What is claimed is:

1. In a fluid flow control valve, the combination of a pressure chamber; a supply port for admitting fluid into the valve; a first opening between the supply port and the pressure chamber; an adjustable needle coacting with said first opening to control the flow of fluid from the supply port into the pressure chamber at a rate slower than the rate supplied to the supply port; a second opening between the supply port and the pressure chamber; means to normally close said second opening; a movable cam means having a normal position and a moved position in said pressure chamber and coacting with said means; means to resist movement of said cam means until the pressure in the pressure chamber reaches a predetermined point, whereupon the pressure of the fluid moves said cam means and through the latter moves the first-named means to open said second port to thereby admit fluid directly from the supply port to the pressure chamber; and means to stop the inflow of fluid to the supply line and open the supply port to exhaust the fluid from the pressure chamber through said second-named opening.

2. In a fluid flow control valve, the combination of a pressure chamber; a supply port for admitting fluid into the valve; two connecting openings to connect the supply port with the pressure chamber whereby fluid is admitted into the pressure chamber, one of said openings being normally open; means to normally close the second opening; a cam means slidably mounted in said pressure chamber coacting with said first-named means; and a resilient means to maintain the cam means in a position wherein the first-named means is in closed position, the resilient means being of such strength that the pressure of the fluid in the pressure chamber, when said pressure reaches a predetermined amount, overcomes the resilient means and slides the cam means and therethrough moves the first-named means into open position to release the fluid in the supply port for passage directly into the pressure chamber to raise the pressure in the pressure chamber.

3. A valve of the class described having a main body; a fluid inlet; a pressure chamber; a metering means between the fluid inlet and the pressure chamber; an opening between the fluid inlet and the pressure chamber; a shut-off means in said opening to normally prevent the flow of fluid from the fluid inlet into the pressure chamber; a spring-actuated slide; a cam surface on said slide normally held in position adjacent the shut-off means, said spring-actuated means movable by the fluid admitted through the metering means when the fluid attains a certain predetermined pressure; and means to shut off the supply of fluid in the fluid inlet and to open the supply inlet to permit the fluid to exhaust through the supply inlet.

4. A valve of the class described having a main body; a fluid inlet in the body; a pressure chamber in the body; a fluid passage between the fluid inlet and the pressure chamber including a metering means to control the rate of flow of the fluid from the fluid inlet into the pressure chamber; a second passage between the fluid inlet and the pressure chamber; a movable shut-off device to normally close the second passage; a spring-urged means normally pressing the shut-off means into closing position; a cam normally in ineffective position but movable to move the shut-off means into a position to open the second-named means; a spring to normally maintain the cam in ineffective position; means to adjust the tension of the spring, said cam movable by the fluid when the fluid pressure reaches a predetermined point, said predetermined point being controlled by the said adjusting means; and means to cause the fluid to be exhausted through the supply inlet after a selected interval.

GUSTAVE C. MILLAT.

REFERENCES CITED

The following references are of record in the file of this patent:

UNITED STATES PATENTS

| Number | Name | Date |
|---|---|---|
| 519,436 | Schweim | May 8, 1894 |
| 1,904,112 | Achard | Apr. 18, 1933 |
| 2,244,894 | Parker | June 10, 1941 |
| 2,247,201 | Loos | June 24, 1941 |
| 2,270,767 | Platz | Jan. 20, 1942 |
| 2,286,104 | Platz | June 9, 1942 |
| 2,322,611 | Winkler | June 22, 1943 |